(12) United States Patent
Zhang et al.

(10) Patent No.: US 10,949,084 B2
(45) Date of Patent: Mar. 16, 2021

(54) DISPLAY SCREEN COMPONENT AND ELECTRONIC DEVICE

(71) Applicant: GUANGDONG OPPO MOBILE TELECOMMUNICATIONS CORP., LTD., Guangdong (CN)

(72) Inventors: Haiping Zhang, Guangdong (CN); Yibao Zhou, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/140,691

(22) Filed: Sep. 25, 2018

(65) Prior Publication Data

US 2019/0155502 A1 May 23, 2019

(30) Foreign Application Priority Data

Nov. 22, 2017 (CN) .......................... 201711176964.1

(51) Int. Cl.
*G06F 3/0488* (2013.01)
*G06F 1/16* (2006.01)
(Continued)

(52) U.S. Cl.
CPC ........ *G06F 3/04886* (2013.01); *G01S 7/4813* (2013.01); *G01S 17/04* (2020.01);
(Continued)

(58) Field of Classification Search
CPC ................................................... G06F 3/0488
See application file for complete search history.

(56) References Cited

U.S. PATENT DOCUMENTS 9,825,103 B2  11/2017  Rappoport et al.
2010/0231528 A1*  9/2010  Wolfe et al. ............ G06F 3/041
(Continued)

FOREIGN PATENT DOCUMENTS

CN    103066087    3/2016
CN    106385511    2/2017
(Continued)

OTHER PUBLICATIONS

EPO, Office Action for EP Application No. 18200373, dated Mar. 22, 2019.
(Continued)

*Primary Examiner* — James J Debrow
(74) *Attorney, Agent, or Firm* — Hodgson Russ LLP

(57) ABSTRACT

A display screen component and an electronic device are provided. The display screen component includes a display screen and a sensor unit arranged at a side of the display screen. The display screen includes a display area and a non-display area. The sensor unit includes a signal emitter and a signal receiver, the signal emitter is arranged at a side of the non-display area, and the signal receiver is arranged at a side of the display area. The non-display area includes a functional portion, the signal emitter is configured to emit a detecting signal to outside through the functional portion and the signal receiver is configured to receive a reflected signal from the outside through the display screen, in which the detecting signal is changed into the reflected signal after being reflected by an external object.

20 Claims, 7 Drawing Sheets

(51) Int. Cl.
  *G01S 7/481* (2006.01)
  *H04M 1/60* (2006.01)
  *G01S 17/88* (2006.01)
  *G01S 17/04* (2020.01)
  *G09G 3/22* (2006.01)
  *H04M 1/02* (2006.01)

(52) U.S. Cl.
  CPC ............ *G01S 17/88* (2013.01); *G06F 1/1605* (2013.01); *G06F 1/1626* (2013.01); *G06F 1/1637* (2013.01); *G06F 1/1698* (2013.01); *G09G 3/22* (2013.01); *H04M 1/0264* (2013.01); *H04M 1/605* (2013.01); *G09G 2360/144* (2013.01); *H04M 2250/12* (2013.01)

(56) References Cited

U.S. PATENT DOCUMENTS

| | | | |
|---|---|---|---|
| 2011/0006190 A1 | 1/2011 | Klameh et al. | |
| 2012/0129580 A1* | 5/2012 | Tam | H04W 88/02 |
| 2013/0229335 A1* | 9/2013 | Whitman et al. | G09G 5/00 |
| 2014/0098063 A1* | 4/2014 | Rojas et al. | G06F 3/042 |
| 2014/0191110 A1* | 7/2014 | Holenarsipur | G01J 1/42 |
| 2014/0218340 A1* | 8/2014 | Rai et al. | G06F 3/042 |
| 2015/0280770 A1* | 10/2015 | Rhee | H04B 1/3888 |
| 2015/0309164 A1 | 10/2015 | Cho et al. | |
| 2015/0381781 A1* | 12/2015 | Feng | H04M 1/0225 |
| 2017/0117336 A1* | 4/2017 | Rappoport et al. | G06F 1/1641 |
| 2017/0344785 A1* | 11/2017 | Zhang et al. | G06K 9/0004 |
| 2018/0267350 A1* | 9/2018 | Sakurai et al. | G02F 1/13306 |
| 2019/0053001 A1* | 2/2019 | Tanabe et al. | H04W 4/021 |

FOREIGN PATENT DOCUMENTS

| | | |
|---|---|---|
| CN | 106453725 | 2/2017 |
| CN | 106453726 | 2/2017 |
| CN | 106774927 | 5/2017 |
| CN | 106850101 | 6/2017 |
| CN | 106850982 | 6/2017 |
| CN | 106850990 | 6/2017 |
| CN | 206259981 | 6/2017 |
| CN | 106940633 | 7/2017 |
| CN | 206370851 | 8/2017 |
| CN | 206370853 | 8/2017 |
| CN | 107888726 | 4/2018 |
| TW | 1582706 | 5/2017 |
| WO | 2011004135 | 1/2011 |

OTHER PUBLICATIONS

SIPO, First Office Action for CN Application No. 201711176964, dated Apr. 29, 2019.
IPO, English Translation of ISR/WO for PCT/CN2018/110881, dated Dec. 28, 2018.
IPAU, First Office Action for AU Application No. 2018372453, dated Aug. 31, 2020.
IPAU, Second Office Action for AU Application No. 2018372453, dated Nov. 25, 2020.

* cited by examiner

DISPLAY SCREEN COMPONENT AND ELECTRONIC DEVICE

CROSS REFERENCE TO RELATED APPLICATION

The present application claims priority to Chinese Application No. 201711176964.1, filed with the State Intellectual Property Office of P. R. China on Nov. 22, 2017, the entire contents of which are incorporated herein by reference.

FIELD

The present disclosure relates to a display screen component and an electronic device.

BACKGROUND

With developments of communication technology, the electronic device (such as the smart phone) is more and more popular. In a process of using the electronic device, for example during a call, in order to avoid the user's misoperations of the electronic device, when the user's face approaches the electronic device to a certain distance, the display screen of the electronic device will go out automatically.

Generally, the electronic device detects the approach or departure of the user's face by the proximity sensor, and the display screen of the electronic device is controlled to go out or light up according to the detected data.

SUMMARY

In a first aspect, embodiments of the present disclosure provide a display screen component, including a display screen and a sensor unit arranged at a side of the display screen. The display screen includes a display area and a non-display area. The sensor unit includes a signal emitter and a signal receiver, the signal emitter is arranged at a side of the non-display area, and the signal receiver is arranged at a side of the display area. The non-display area includes a functional portion, the signal emitter is configured to emit a detecting signal to outside through the functional portion and the signal receiver is configured to receive a reflected signal from the outside through the display screen, in which the detecting signal is changed into the reflected signal after being reflected by an external object.

In a second aspect, embodiments of the present disclosure provide an electronic device, including a housing, a display screen component and a cover plate. The display screen component is coupled to the housing. The cover plate is coupled to the display screen component and configured to cover the display screen component. The display screen component includes a display screen and a sensor unit arranged below the display screen. The display screen includes a display area and a non-display area. The sensor unit includes a signal emitter and a signal receiver, the signal emitter is arranged below the non-display area, and the signal receiver is arranged below the display area. The non-display area includes a functional portion configured to be passed through by a detecting signal emitted by the signal emitter to outside. The signal receiver is configured to receive a reflected signal from the outside through the display screen, in which the detecting signal is changed into the reflected signal after being reflected by an external object.

In a third aspect, embodiments of the present disclosure provide another electronic device, including a housing, a display screen component and a circuit board. The display screen component is coupled to the housing. The circuit board is arranged in the housing and electronically coupled to the display screen component. The display screen component includes a display screen and a sensor unit arranged below the display screen. The display screen includes a display area and a non-display area. The sensor unit includes a signal emitter and a signal receiver, the signal emitter is arranged below the non-display area, and the signal receiver is arranged below the display area. The non-display area includes a functional portion configured to be passed through by a detecting signal emitted by the signal emitter to outside.

BRIEF DESCRIPTION OF THE DRAWINGS

To describe technical solutions in embodiments of the present disclosure more clearly, the following will briefly introduce the accompanying drawings required for the description of the embodiments. Obviously, the accompanying drawings described below show some embodiments of the present disclosure, and those skilled in the art can obtain other drawings based on these drawings without paying creative efforts.

DETAILED DESCRIPTION

Figure 1:
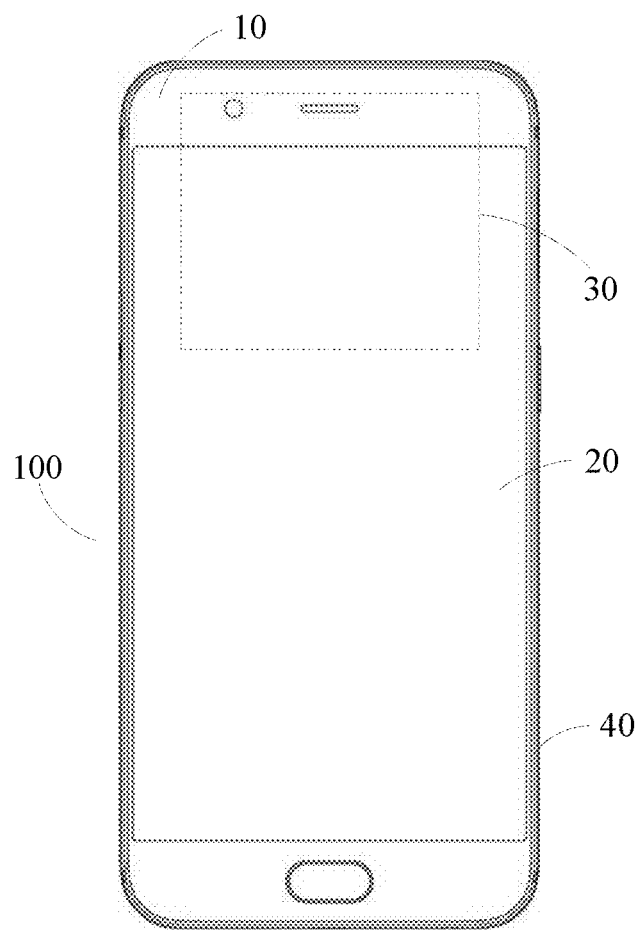
FIG. 1 is a schematic view of an electronic device according to an embodiment of the present disclosure.

Technical solutions in embodiments of the present disclosure will be clearly and completely described below with reference to the accompanying drawings in the embodiments of the present disclosure. Obviously, the embodiments described herein are only a part but not all of the embodiments of the present application. Based on the embodiments of the present disclosure, all other embodiments obtained by those skilled in the art without paying creative efforts, fall into the protection scope of the present application.

In the specification, it is to be understood that terms such as "central," "upper," "lower," "front," "rear," "vertical," "horizontal," "top," "bottom," "inner," "outer," should be construed to refer to the orientation as then described or as shown in the drawings under discussion. These relative terms are for convenience of description and do not require that the present disclosure be constructed or operated in a particular orientation. In the description of the present disclosure, "a plurality of" means two or more than two, unless specified otherwise.

In the present disclosure, unless specified or limited otherwise, the terms "mounted," "connected," "coupled" and the like are used broadly, and may be, for example, fixed connections, detachable connections, or integral connections; may also be mechanical or electrical connections; may also be direct connections or indirect connections via intervening structures; may also be inner communications of two elements or interaction relationships between two elements. The above terms can be understood by those skilled in the art according to specific situations. In the description of the present disclosure, a structure in which a first feature is "on" or "beneath" a second feature may include an embodiment in which the first feature directly contacts the second feature, and may also include an embodiment in which an additional feature is formed between the first feature and the second feature so that the first feature does not directly contact the second feature, unless otherwise specified. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature has a sea level elevation larger than the sea level elevation of the second feature. While first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature has a sea level elevation smaller than the sea level elevation of the second feature.

The following disclosure provides many different embodiments or examples to realize different structures of the present disclosure. To simplify the disclosure of the present disclosure, components and configurations in particular examples are elaborated. Of course, they are illustrative, and are not intended to limit the present disclosure. Moreover, reference numbers and/or letters may be repeated in different examples of the present disclosure for the purpose of simplicity and clarity, which shall not be constructed to indicate the relationships among various embodiments and/or configurations. In addition, the present disclosure provides examples of various specific processes and materials, but applicability of other processes and/or utilization of other materials are conceivable for those skilled in the art.

In some embodiments of the present disclosure, an electronic device is provided, and includes a housing, a display screen component and a cover plate. The display screen component is coupled to the housing. The cover plate is coupled to the display screen component and configured to cover the display screen component. The display screen component includes a display screen and a sensor unit arranged below the display screen. The display screen includes a display area and a non-display area. The sensor unit includes a signal emitter and a signal receiver, the signal emitter is arranged below the non-display area, and the signal receiver is arranged below the display area. The non-display area includes a functional portion configured to be passed through by a detecting signal emitted by the signal emitter to outside. The signal receiver is configured to receive a reflected signal from the outside through the display screen, in which the detecting signal is changed into the reflected signal after being reflected by an external object.

In other embodiments of the present disclosure, another electronic device is provided, and includes a housing, a display screen component and a circuit board. The display screen component is coupled to the housing. The circuit board is arranged in the housing and electronically coupled to the display screen component. The display screen component includes a display screen and a sensor unit arranged below the display screen. The display screen includes a display area and a non-display area. The sensor unit includes a signal emitter and a signal receiver, the signal emitter is arranged below the non-display area, and the signal receiver is arranged below the display area. The non-display area includes a functional portion configured to be passed through by a detecting signal emitted by the signal emitter to outside.

Figure 2:
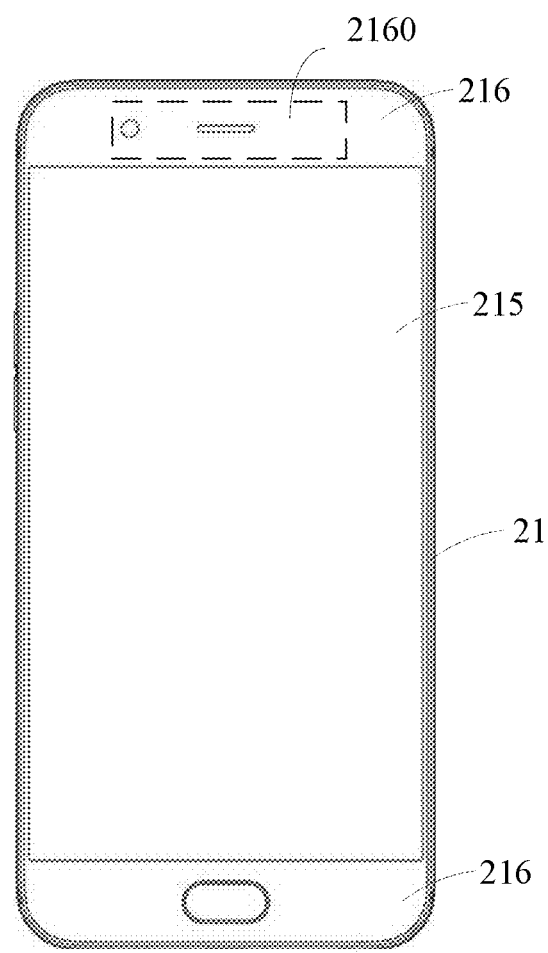
FIG. 2 is another schematic view of the electronic device in FIG. 1, in which a functional portion is illustrated.

The electronic device may be a smart phone, a tablet personal computer or the like. As illustrated in FIG. 1 and FIG. 2, the electronic device 100 includes a cover plate 10, a display screen component 20, a circuit board 30 and a housing 40.

The cover plate 10 is coupled to the display screen component 20 so as to cover the display screen component 20. The cover plate 10 may a transparent glass cover plate. In some embodiments, the cover plate 10 may be a glass cover plate made of materials such as sapphire or the like.

The display screen component 20 is coupled to the housing 40 to provide a display surface of the electronic device 100. The display screen component 20 serves as a front cover of the electronic device 100 to define an enclosed space together with the housing 40, for receiving other electronic elements of the electronic device 100 therein. Also, the display screen component 20 serves as the display surface of the electronic device 100 for displaying information such as images, texts or the like.

The circuit board 30 is arranged in the housing 40, such that the circuit board 30 is received in the above enclosed space. The circuit board 30 may be a mainboard of the electronic device 100. The circuit board 30 has a ground point for grounding of the circuit board 30. The circuit board 30 may be integrated with functional components such as a camera, a processor or the like. Also, the display screen component 20 may be electronically coupled to the circuit board 30.

In some embodiments, the circuit board 30 has a display control circuit. The display control circuit outputs an electrical signal to the display screen component 20, so as to control the display screen component 20 to display information.

The housing 40 provides an external outline of the electronic device 100. The housing 40 may be made of plastics or metal. The housing 40 may be integrally molded.

In some embodiments of the present disclosure, the display screen component includes a display screen and a sensor unit arranged at a side of the display screen. The display screen includes a display area and a non-display area. The sensor unit includes a signal emitter and a signal receiver, the signal emitter is arranged at a side of the non-display area, and the signal receiver is arranged at a side of the display area. The non-display area includes a functional portion, the signal emitter is configured to emit a detecting signal to outside through the functional portion, and the signal receiver is configured to receive a reflected signal from the outside through the display screen, in which the detecting signal is changed into the reflected signal after being reflected by an external object.

Figure 3:
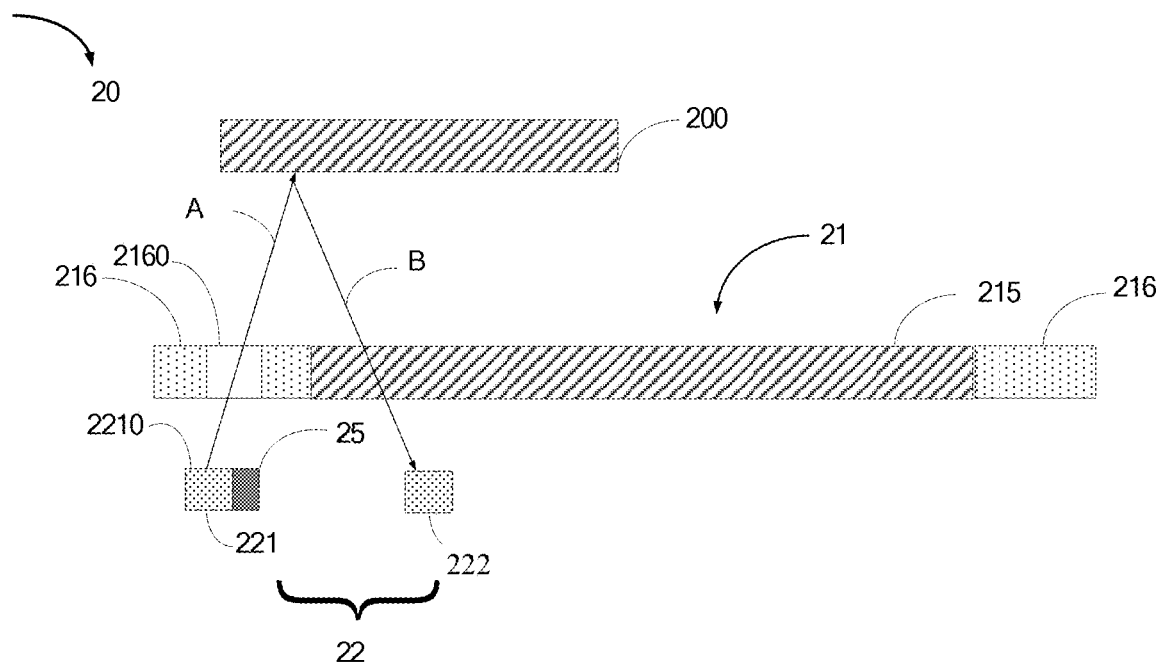
FIG. 3 is a schematic view of a display screen component according to an embodiment of the present disclosure.

In some embodiments, as illustrated in FIG. 3, the display screen component 20 includes a display screen 2 and a sensor unit 22. The sensor unit 22 is arranged at a side of the display screen 21.

It may be understood that the sensor unit 23 is arranged at an inner side of the display screen 21. The inner side means an invisible side of the display screen 21, when observed from an exterior of the electronic device 100. That is, the sensor unit 22 is arranged inside the electronic device 100.

The display screen 21 may include a display area 215 and a non-display area 216. The display area 215 executes a display function of the display screen 21, so as to display information. The non-display area 216 does not display information. The display screen 21 may include a plurality of non-display areas 216 spaced apart from one another. For example, the non-display area 216 is provided at each of a top and a bottom of the display screen 21. The non-display area 216 may be used to receive a functional unit 25, and the functional unit 25 includes at least one of a camera, a telephone receiver and a fingerprint module.

The sensor unit 22 may include a signal emitter 221 and a signal receiver 222.

The signal emitter 221 is arranged at a side of the non-display area 216. For example, the signal emitter 221 may be arranged at a side of the non-display area 216 at the top of the display screen 21. The signal receiver 222 is arranged at a side of the display area 215.

It may be understood that the signal emitter 221 is arranged at an inner side of the non-display area 216 of the display screen 21 (i.e. a lower side of the non-display area 216), and the signal receiver 222 is arranged at an inner side of the display area 215 of the display screen 21 (i.e. a lower side of the display area 215). The inner side (or the lower side) means the invisible side of the display screen 21, when observed from the exterior of the electronic device 100.

The non-display area 216 further includes a functional portion 2160, and the functional portion 2160 is configured to receive the functional unit, such as the camera, the telephone receiver and the fingerprint module.

The signal emitter 221 is configured to emit a detecting signal A to outside (in practical applications, the signal emitter 221 emits the detecting signal A to the outside according to its signal-emission frequency space), the detecting signal A is emitted to the outside through the functional portion 2160, the detecting signal A becomes into a reflected signal B after being reflected by an external object 200 (such as a user's face), and the reflected signal B enters the signal receiver 222 through the display screen 21.

In some embodiments, the signal emitter 221 may be arranged at a side of the functional portion 2160 or even below the functional portion 2160. In some embodiments, the signal emitter 221 has a signal-emission surface 2210 facing the functional portion 2160.

In embodiments of the present disclosure, the functional portion 2160 is configured to achieve a certain function of the electronic device 100, such as taking photos, making calls, identifying fingerprints and so on. In this condition, the functional portion 2160 may receive the functional unit 25 therein or be aligned with at least a part of the functional unit 25, so as to achieve above functions.

Figure 4:
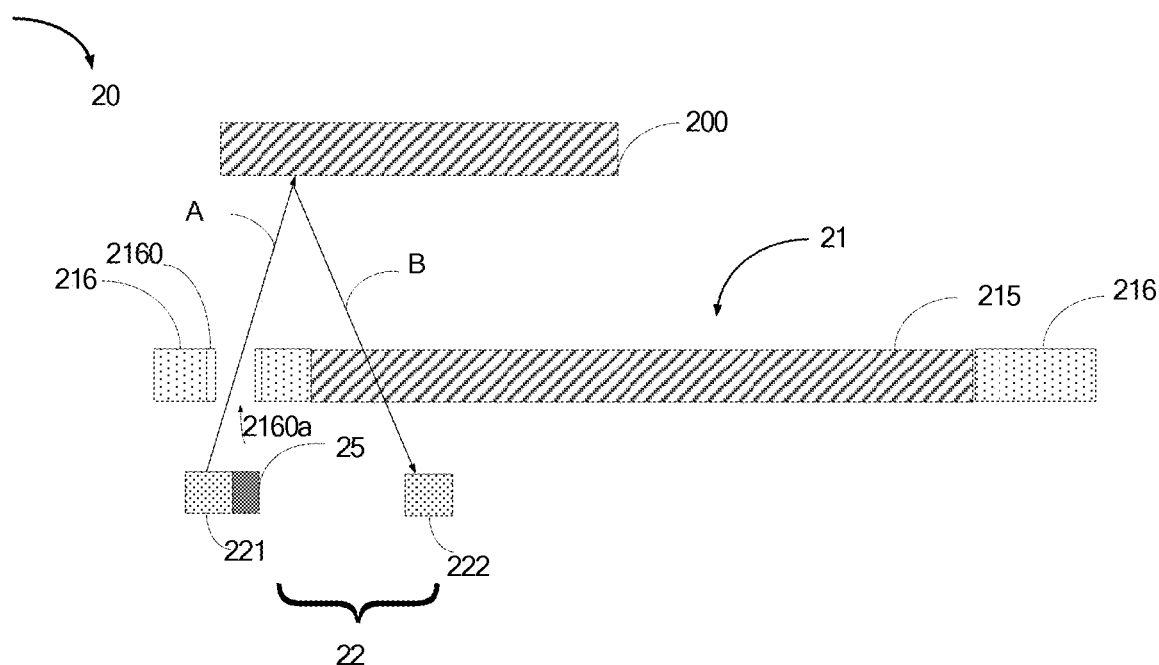
FIG. 4 is another schematic view of the display screen component in FIG. 3, in which an example structure of a functional portion is illustrated.

In some embodiments, as illustrated in FIG. 4, the functional portion 2160 defines an opening 2160a therein. The opening 2160a may be a functional opening for the functional unit 25. For example, when the functional unit 25 includes the camera, the opening 2160a may be a camera opening, allowing the camera to collect images of the outside. When the functional unit 25 includes the telephone receiver, the opening 2160a may be a telephone receiver opening, allowing the telephone receiver to transmit voices to the outside.

In some embodiments, in order to reduce the number of openings, and also to simplify the design of the electronic device 100, the functional unit 25 and the signal emitter 221 may share the opening 2160a.

For example, when the functional unit 25 includes the camera, the camera and the signal emitter 221 share the opening 2160a. When the functional unit 25 includes the telephone receiver, the telephone receiver and the signal emitter 221 share the opening 2160a.

Figure 5:
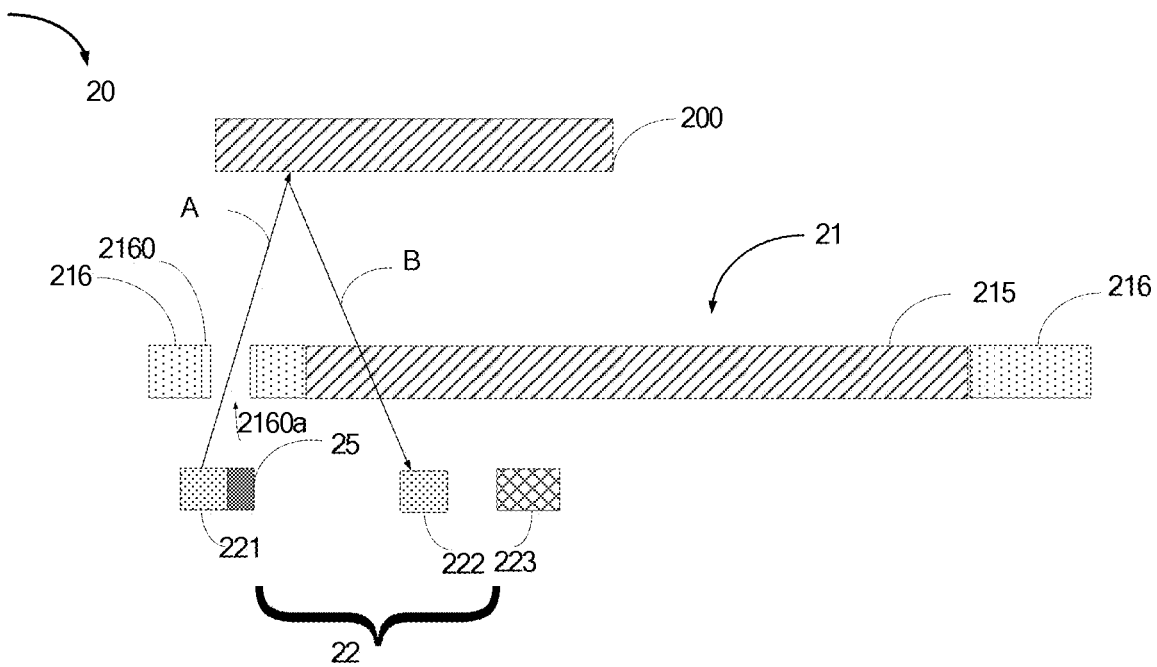
FIG. 5 is a schematic view of a display screen component according to another embodiment of the present disclosure.

In some embodiments, as illustrated in FIG. 5, the sensor unit 22 further includes an ambient-light sensor 223 arranged at the side of the display area 215. It may be understood that the ambient-light sensor 223 is arranged at the inner side of the display screen 21, and located below the display area 215. The ambient-light sensor 223 is used to sense an external ambient light signal. The ambient-light sensor 223 can transmit light sensation information to a processor, and the processor will control a brightness of the display screen 21 according to the light sensation information.

The ambient-light sensor 23 has a light sensing surface facing the display screen 21. In some embodiments, the light sensing surface of the ambient-light sensor 23 faces the display area 215 of the display screen 21. The external ambient light signal enters the ambient-light sensor 223 through the display area 215.

Figure 6:
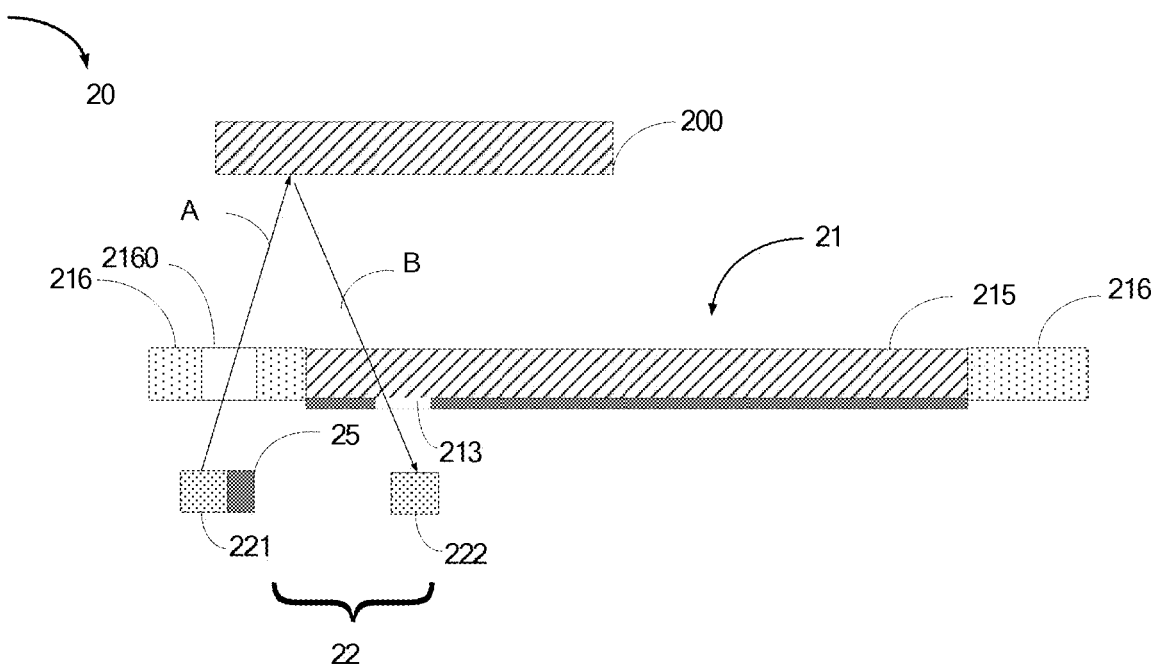
FIG. 6 is a schematic view of a display screen component according to a further embodiment of the present disclosure.

In some embodiments, as illustrated in FIG. 6, the display screen 21 is provided with a light shield layer 210 at a side thereof facing the sensor unit 22, the light shield layer 210 defines a signal receiving hole 213 corresponding to the signal receiver 222, and the signal receiving hole 213 allows signals (such as optical signals and acoustical signals) to pass therethrough.

The signal emitter 221 is used to emit the detecting signal A to the outside. The detecting signal A is emitted to the outside through the functional portion 2160. The detecting signal A becomes into the reflected signal B after touching the external object 200 (such as the user's face). The reflected signal B passes through the display screen 21 and the signal receiving hole 213, and enters the signal receiver 222.

Figure 7:
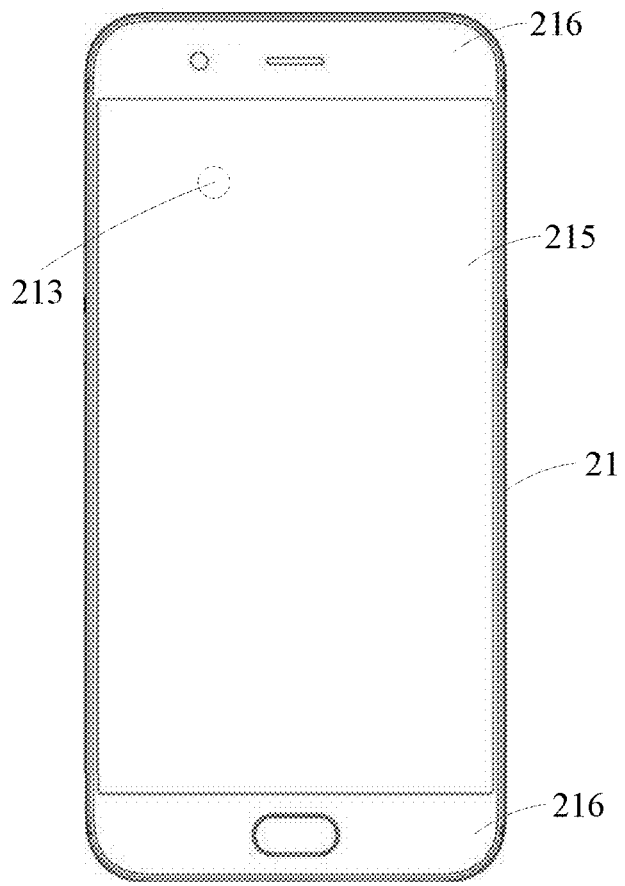
FIG. 7 is another schematic view of the electronic device in FIG. 1, in which a signal receiving hole is illustrated.

In some embodiments, as illustrated in FIG. 7, the display screen 21 includes the display area 215 and the non-display area 216. The display area 215 executes the display function of the display screen 21, so as to display information. The non-display area 216 does not display information. The display screen 21 may include a plurality of non-display areas 216 spaced apart from one another. For example, the non-display area 216 is provided at each of the top and the bottom of the display screen 21. The non-display area 216 may be used to receive functional units, such as the camera, the telephone receiver and the fingerprint module.

The signal receiving hole 213 in the light shield layer 210 of the display screen 21 is located at the display area 215 of the display screen 21. With the signal receiving hole 213 and the functional portion 2160, the sensor unit 22 can achieve a proximity sensing function of the electronic device 100, such that there is no need to provide an opening in the non-display area of the display screen 21 additionally.

In some embodiments, the signal receiving hole 213 and the opening 214 each is a round hole. The signal receiving hole has a diameter of 2-4 millimeters. In other embodiments, the signal receiving hole 213 may also be a square hole, an elliptical hole or a hole having another shape.

Figure 8:
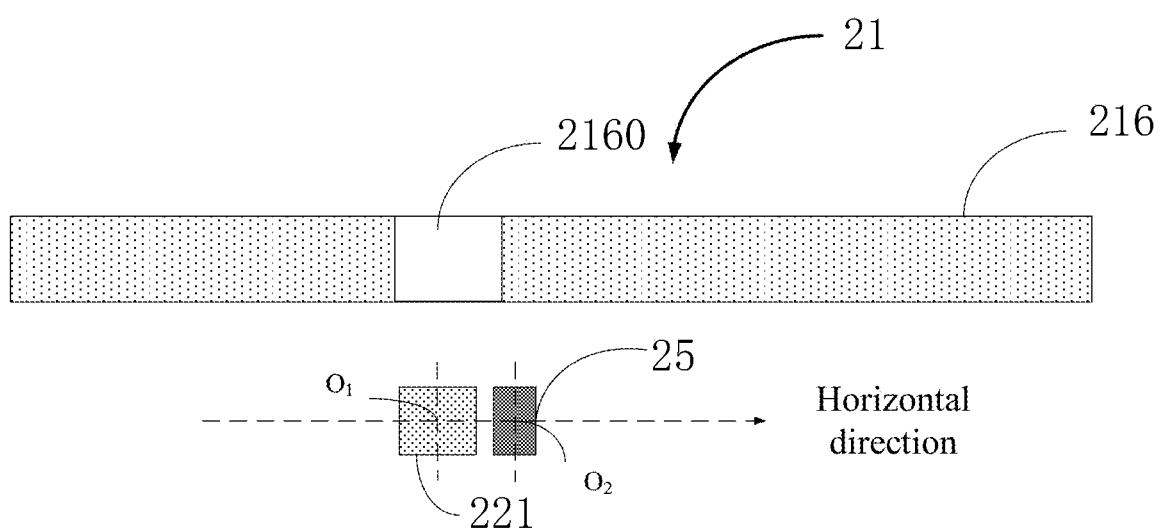
FIG. 8 is a schematic view illustrating an arrangement of a single emitter and a functional unit in any display screen component according to above embodiments of the present disclosure.

In some embodiments, for convenience of the layout of the electronic device 100, as illustrated in FIG. 8, the signal emitter 221 and the functional unit 25 both are arranged in a horizontal direction, that is, a connecting line between centers $O_1$, $O_2$ of the signal emitter 21 and the functional unit 25 is a horizontal line, and perpendicular to a long side edge of the electronic device 100.

In other words, the centers $O_1$, $O_2$ of the signal emitter 21 and the functional unit 25 are arranged in the horizontal direction, as shown in FIG. 8.

The opening 2160a may be formed in various manners. For example, in some embodiments, the opening 2160a may be defined by the non-display area 216 and the housing 40 together.

Figure 9:
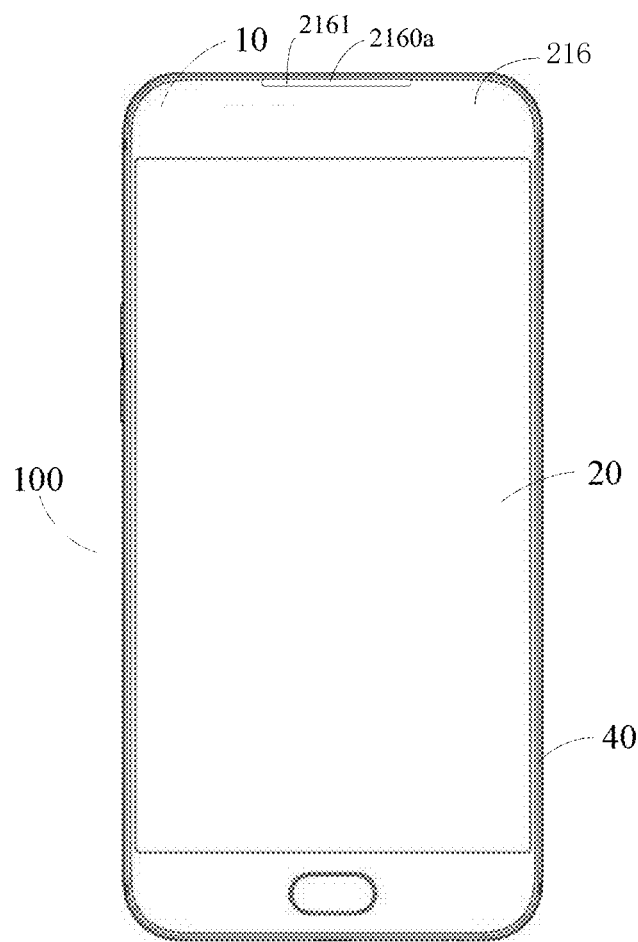
FIG. 9 is a schematic view of an electronic device according to another embodiment of the present disclosure.

In some embodiments, as illustrated in FIG. 9, in order to reduce a size of the non-display area 216, and also to increase a screen-to-body ratio of the electronic device 100, the non-display area 216 defines a notch 2161 at an edge thereof, and the opening 2160a is formed via enclosing the notch 2161 of the non-display area 2161 by the housing 40 of the electronic device 100. It may be understood that the opening 2160a is a gap between the display screen 21 and the housing 40.

For example, as illustrated in FIG. 9, the opening 2160a is formed via enclosing the notch 2161 of the non-display area 216 at the top of the electronic device 100 by the housing 40 of the electronic device 100. That is, the opening 2160a is a gap between the top of the display screen 21 and the housing 40.

In some embodiments, the opening 2160a is a round hole. The opening 2160a has a diameter of 2-4 millimeters. In other embodiments, the opening 2160a may also be a square hole, an elliptical hole or a hole having another shape.

In some embodiments, the signal emitter 221 is an infrared emitter used to emit an infrared light, and the signal receiver 222 is an infrared receiver used to receive the infrared light.

In some embodiments, the display screen 21 may be a liquid crystal display (LCD) or an organic light-emitting diode (OLED) display. When the display screen 21 is the liquid crystal display, the display screen 21 includes a backlight plate, a lower polarizer, an array substrate, a liquid crystal layer, a color film substrate and an upper polarizer which are laminated in sequence. When the display screen 21 is the organic light-emitting diode display, the display screen 21 includes a base layer, an anode, an organic layer, an electrically conductive layer, an emitting layer and a cathode which are laminated in sequence.

In embodiments of the present disclosure, the signal emitter 221 is arranged at the side of the non-display area 216, and the detecting signal emitted by the signal emitter 221 can be emitted to the outside through the functional portion 2160 in the non-display area 216, such that the detecting signal is prevented from being directly emitted through the display area 215 of the display screen 21, thus improving the penetrability and transmittance of the detecting signal, and hence enhancing the density of the signal received by the signal receiver. Thus, a detecting accuracy of the sensor unit is improved, and hence an accuracy of the electronic device controlling a state of the display screen is enhanced.

Figure 10:
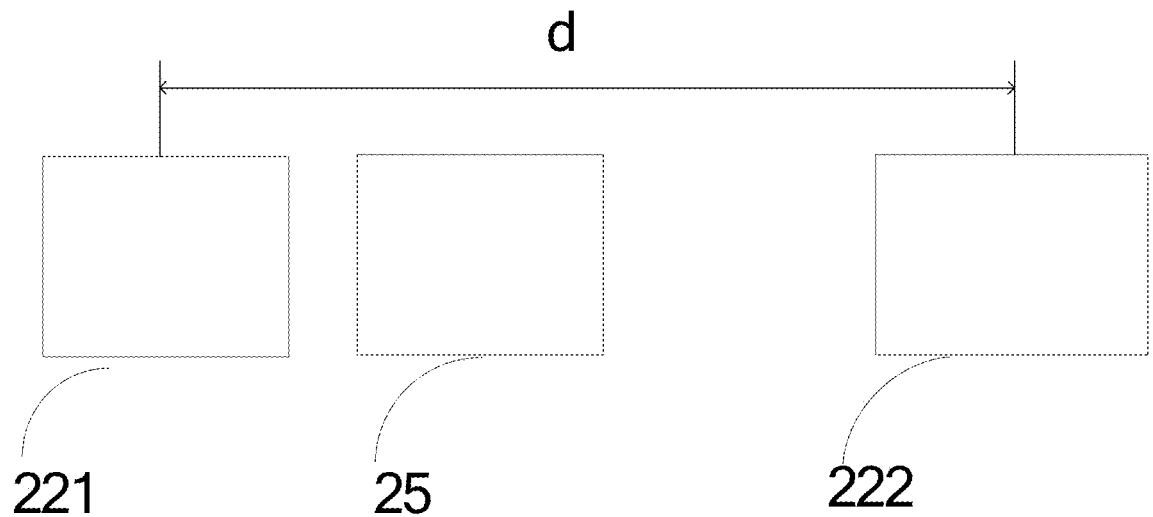
FIG. 10 is a schematic view of a sensor unit according to an embodiment of the present disclosure.

In some embodiments, as illustrated in FIG. 10, the sensor unit 22 includes the signal emitter 221 and the signal receiver 222. The signal emitter 221, the signal receiver 222 and the functional unit 25 are spaced from one another. A distance d between the signal emitter 221 and the signal receiver 222 is in a range of 2-14 millimeters. It may be understood that the above distance is a distance between a geometric center of the signal emitter 221 and a geometric center of the signal receiver 222. The signal emitter 221, the signal receiver 222 and the functional unit 25 are spaced apart from one another so as to increase isolation among the signal emitter 221, the signal receiver 222 and the functional unit 25, thus reducing effects of the signal emitted by the signal emitter 221 on the signal receiver 222 and the functional unit 25.

Figure 11:
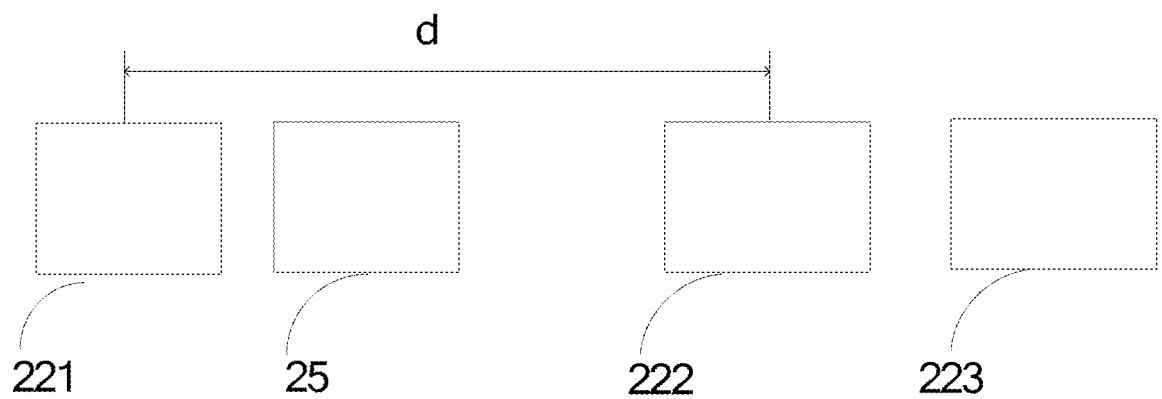
FIG. 11 is a schematic view of a sensor unit according to another embodiment of the present disclosure.

In some embodiments, as illustrated in FIG. 11, the sensor unit 22 includes the signal emitter 221, the signal receiver 222 and the ambient-light sensor 223. The ambient-light sensor 223 is used to detect a density of an ambient light. The electronic device 100 can adjust the brightness of the display screen 21 according to the density of the ambient light detected by the ambient-light sensor 223.

The signal emitter 221, the signal receiver 222, the ambient-light sensor 223 and the functional unit 25 are spaced from one another. A distance d between the signal emitter 221 and the signal receiver 222 is in a range of 2-14 millimeters. It may be understood that the above distance is a distance between a geometric center of the signal emitter 221 and a geometric center of the signal receiver 222. Since the signal emitter 221, the signal receiver 222, the ambient-light sensor 223 and the functional unit 25 are spaced from one another, isolation among the signal emitter 221, the signal receiver 222, the ambient-light sensor 223 and the functional unit 25 is improved, thus reducing effects of the signal emitted by the signal emitter 221 on the signal receiver 222, the functional unit 25 and the ambient-light sensor 223.

Figure 12:
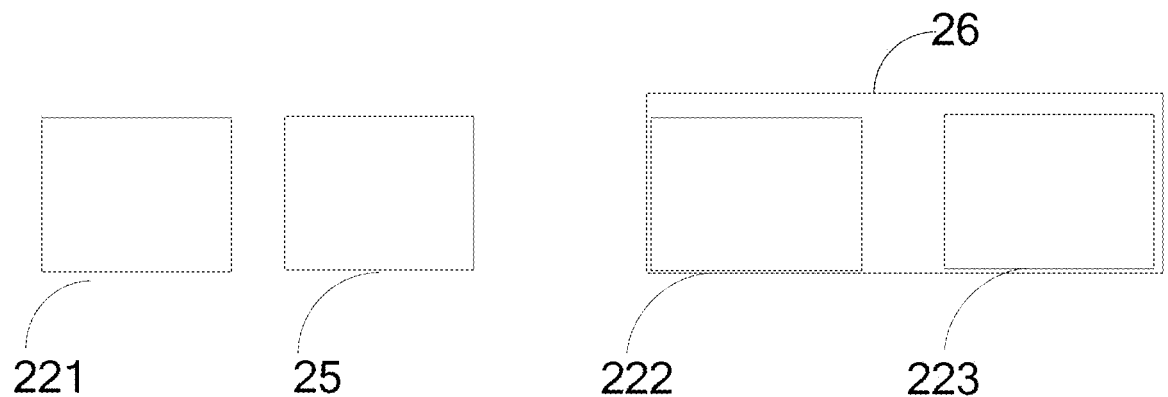
FIG. 12 is another schematic view of the sensor unit in FIG. 11, in which a signal receiver and an ambient-light sensor are packaged into a chip.

In some embodiments, as illustrated in FIG. 12, the signal receiver 222 and the ambient-light sensor 223 are packaged into a chip 26.

The above is the detailed introduction of the display panel and the electronic device according to embodiments of the present disclosure, the principle and the implementation mode of the present disclosure are elaborated by means of specific examples, and the illustration for the above embodiments are merely used to understand the present disclosure. Meanwhile, the specific embodiments and the applied ranges can be changed for those skilled in the art according to the concept of the present disclosure. In general, the content of the present specification should not be construed to limit the present disclosure.

What is claimed is:

1. A display screen component for an electronic device, comprising:
   a display screen comprising a display area and a non-display area; and
   a sensor unit disposed below the display screen, and comprising a signal emitter and a signal receiver, the signal emitter being arranged below the non-display area, and the signal receiver being arranged below the display area and aligned with at least part of the display area,
   wherein the non-display area comprises a functional portion configured to achieve a function of the electronic device, the signal emitter is aligned with at least part of the functional portion and is configured to emit a detecting signal to outside through the functional portion, and the signal receiver is configured to receive a reflected signal from the outside through the display area of the display screen, in which the detecting signal is changed into the reflected signal after being reflected by an external object.

2. The display screen component according to claim 1, wherein the signal emitter has a signal-emission surface facing the functional portion.

3. The display screen component according to claim 1, wherein the functional portion defines an opening therein.

4. The display screen component according to claim 3, further comprising a functional unit, wherein the functional unit shares the opening with the signal emitter.

5. The display screen component according to claim 4, wherein both centers of the functional unit and the signal emitter are arranged in a horizontal direction.

6. The display screen component according to claim 4, wherein the functional unit comprises at least one of a camera and a telephone receiver.

7. The display screen component according to claim 3, wherein the non-display area defines a notch at an edge thereof, and the notch is enclosed by a housing of the electronic device to define the opening.

8. The display screen component according to claim 3, wherein the opening is a round hole and has a diameter of 2-4 millimeters.

9. The display screen component according to claim 1, wherein the display screen is provided with a light shield layer at a side thereof facing the sensor unit, and the light shield layer defines a signal receiving hole therein; the signal receiver is configured to receive the reflected signal through the display screen and the signal receiving hole.

10. The display screen component according to claim 1, wherein the sensor unit further comprises an ambient-light sensor disposed at the side of the display area, and the ambient-light sensor is configured to sense an external ambient light signal.

11. The display screen component according to claim 10, wherein the ambient-light sensor has a light sensing surface facing the display area of the display screen.

12. The display screen component according to claim 1, wherein the display area has a first surface configured to face the external object, and a second surface opposite to the first surface and facing away from the first surface, the signal receiver is positioned at a side of the second surface of the display area, and the signal receiver is remote away from the first surface relative to the second surface.

13. An electronic device, comprising:
a housing;
a display screen component coupled to the housing; and
a cover plate coupled to the display screen component and configured to cover the display screen component,
wherein the display screen component comprises:
a display screen comprising a display area and a non-display area; and
a sensor unit arranged below the display screen, and comprising a signal emitter and a signal receiver, the signal emitter being arranged below the non-display area and aligned with at least part of the non-display area, and the signal receiver being arranged below the display area and aligned with at least part of the display area,
wherein the non-display area comprises a functional portion configured to be passed through by a detecting signal emitted by the signal emitter to outside,
the signal receiver is configured to receive a reflected signal from the outside through the display area of the display screen, in which the detecting signal is changed into the reflected signal after being reflected by an external object.

14. The electronic device according to claim 13, wherein the functional portion defines an opening therein.

15. The electronic device according to claim 14, wherein the non-display area defines a notch at an edge thereof, and the notch is enclosed by a housing of the electronic device to define the opening.

16. An electronic device, comprising:
a housing;
a display screen component coupled to the housing; and
a circuit board arranged in the housing and electronically coupled to the display screen component,
wherein the display screen component comprises:
a display screen comprising a display area and a non-display area; and
a sensor unit arranged below the display screen, and comprising a signal emitter and a signal receiver, the signal emitter being arranged below the non-display area and aligned with at least part of the non-display area, and the signal receiver being arranged below the display area and aligned with at least part of the display area,
wherein the non-display area comprises a functional portion configured to be passed through by a detecting signal emitted by the signal emitter to outside,
the signal receiver is configured to receive a reflected signal from the outside through the display area of the display screen, in which the detecting signal is changed into the reflected signal after being reflected by an external object.

17. The electronic device according to claim 16, wherein the functional portion defines an opening therein.

18. The electronic device according to claim 17, wherein the non-display area defines a notch at an edge thereof, and the notch is enclosed by a housing of the electronic device to define the opening.

19. The electronic device according to claim 17, further comprising a functional unit, wherein the functional unit shares the opening with the signal emitter.

20. The electronic device according to claim 19, wherein both centers of the functional unit and the signal emitter are arranged in a horizontal direction.

* * * * *